United States Patent [19]

Plichta et al.

[11] Patent Number: 5,154,991

[45] Date of Patent: Oct. 13, 1992

[54] FLEXIBLE SOLID ELECTROLYTE SEPARATOR FOR USE IN A HIGH TEMPERATURE ELECTROCHEMICAL CELL, METHOD OF MAKING THE SEPARATOR, AND ELECTROCHEMICAL CELL INCLUDING THE SEPARATOR

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 715,099

[22] Filed: Jun. 10, 1991

[51] Int. Cl.$^5$ .......................................... H07M 10/22
[52] U.S. Cl. ................................. 429/193; 429/226; 524/444

[58] Field of Search ....................... 429/193, 221, 226; 524/444, 450; 264/122; 252/62.2

[56] References Cited

U.S. PATENT DOCUMENTS

| | | | |
|---|---|---|---|
| 4,468,362 | 8/1984 | Solomon | 264/122 X |
| 4,935,316 | 6/1990 | Resey | 429/221 X |
| 4,977,007 | 12/1990 | Kondo et al. | 429/193 X |
| 4,990,413 | 2/1991 | Lee et al. | 429/193 X |

*Primary Examiner*—Stephen Kalafut
*Attorney, Agent, or Firm*—Michael Zelenka; Roy E. Gordon

[57] ABSTRACT

A teflon-bonded thin, flexible $\beta''$-$Al_2O_3$ solid electrolyte separator is provided for use in a high temperature electrochemical cell including a sodium-lead alloy anode ($Na_{0.9}Pb_{0.1}$) and an $FeS_2$ cathode.

2 Claims, No Drawings

FLEXIBLE SOLID ELECTROLYTE SEPARATOR FOR USE IN A HIGH TEMPERATURE ELECTROCHEMICAL CELL, METHOD OF MAKING THE SEPARATOR, AND ELECTROCHEMICAL CELL INCLUDING THE SEPARATOR

GOVERNMENT INTEREST

The invention described herein may be manufactured, used, and licensed by or for the Government for governmental purposes without the payment to us of any royalty thereon.

FIELD OF INVENTION

This invention relates in general to a method of making a solid, flexible electrolyte separator for use in a high temperature electrochemical cell and in particular to a method of preparing a flexible, free standing beta alumina ($\beta''$-Al$_2$O$_3$) electrolyte separator for use in a high temperature sodium cell.

BACKGROUND OF THE INVENTION

Typical solid electrolytes used for high temperature sodium cells utilize a solid ceramic $\beta''$-Al$_2$O$_3$ sealed end tube into which either the anode or cathode component is added. The disadvantage of this cell design is that the $\beta''$-Al$_2$O$_3$ tubes are rigid ceramics, that by their nature are brittle and easily cracked when stretched. In addition, because the tubes are fragile, the thickness of the tubes must be made relatively large (>0.5 mm) so as to provide for a margin of safety should the separator fail once the cell was molten at the high operating temperatures of greater than 200° C.

SUMMARY OF THE INVENTION

The general object of this invention is to provide a method of making flexible, free standing $\beta''$-Al$_2$O$_3$ electrolyte separator for use in a high temperature sodium cell. A more specific object of the invention is to provide a method of making a flexible solid $\beta''$-Al$_2$O$_3$ electrolyte separator that is inherently less fragile, and that can be made thinner than a rigid ceramic separator thereby allowing for the preparation of sodium cells that are capable of higher power without the safety problems associated with the rigid ceramic separators.

It has now been found that the aforementioned objects can be attained and a flexible electrolyte separator provided by a method of preparation containing Teflon as a mechanical binder that is sintered at 280° C. for one hour under vacuum. More specifically, a flexible solid electrolyte separator is obtained according to the invention by a method including the steps of:

(A) mixing about 80 to about 95 weight percent of powdered $\beta''$-Al$_2$O$_3$ with about 5 to 15 weight percent of Teflon,
(B) adding a distilled water-isopropylalcohol solution (about 60 about 40 weight percent) in drop wise additions to the mixture to form a stiff dough,
(C) roll pressing and sintering the dough at about 290° C. for about one hour under vacuum, and
(D) cooling under vacuum to ambient temperature.

The $\beta''$-Al$_2$O$_3$ electrolyte prepared using this method is found to be flexible and impervious to chemical attack when exposed to the components used in high temperature sodium cells up to 300° C. In addition, a flexible $\beta''$-Al$_2$O$_3$ electrolyte separator prepared by the method of the invention and used in a solid state Na$_{0.9}$Pb$_{0.1}$/$\beta''$-Al$_2$O$_3$/FeS$_2$ electrochemical cell is found to be capable of galvanostatic cycling at current densities up to 0.25 mA/cm$^2$ when operated at 280° C.

Flexible $\beta''$-Al$_2$O$_3$ electrolyte separator can be prepared using about 80 to about 95 weight percent powdered $\beta''$-Al$_2$O$_3$ (−120 mesh, Cerametic grade) mixed with about 5 to about 15 weight percent Teflon from Dupont Teflon-60 aqueous emulsion. Into the aforementioned mixture is added a distilled water-isopropylalcohol solution (60/40 wt%) in drop wise additions until a tough dough like consistency is attained. The dough is then successively roll pressed between two Mylar plastic sheets to a thickness of about 0.5 millimeter. The rolled sheet is then placed between two polished aluminum plates, to avoid curling, and sintered at 280° C. for one hour in an evacuated oven. The Teflon sintered $\beta''$-Al$_2$O$_3$ is cooled under vacuum to ambient temperature before being transferred into an argon filled glove box.

DESCRIPTION OF THE PREFERRED EMBODIMENT

A flexible $\beta''$-Al$_2$O$_3$ electrolyte preparation utilizing 95 weight percent $\beta''$-Al$_2$O$_3$ (−120 mesh powder, Ceramatec grade) and, 5 weight percent Teflon as the separator binder is sintered at 280° C. for one hour under vacuum. This flexible electrolyte is prepared into a high temperature solid state electrochemical cell including 0.134 gram of sodium-lead alloy anode, (Na$_{0.9}$Pb$_{0.1}$) having dimensions of 2.54 cm diameter and 0.06 cm thickness, 0.093 gram of flexible $\beta''$-Al$_2$O$_3$ electrolyte having dimensions of 2.54 cm diameter and 0.039 cm thickness, and 0.091 diameter and 0.03 cm thickness. The cathode is prepared in a similar manner as the electrolyte using a composition of 80 weight percent FeS$_2$, 10 weight percent graphite powder, and 10 weight percent Teflon. The anode, electrolyte, and cathode disks are stacked and spring loaded between a graphite disk current collector, having a diameter of 2.54 cm, at the cathode side and the stainless steel cell can as the current collector at the anode side. The cell is hermetically sealed in a stainless steel can having dimensions of 2.54 cm diameter, 2.54 cm height, and 0.05 cm thickness affixed with a stainless steel lid having glass to metal sealed electrical feed throughs. Electrical connection to the cell is provided by spot welding electrical leads to the can and to the insulated feed through in the can's lid. The cell is then heated to 280° C. where an open circuit potential of 1.5 volts is observed. Galvanostatic cycling is performed at 280° C. at 0.25 mA/cm$^2$ between set voltage limits of 3.25 and 0.2 volts.

The theoretical reactions for the cell are given by the following equations I and II.

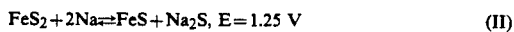

$$FeS_2 + 2Na \rightleftharpoons FeS + Na_2S, E = 1.25 V \qquad (II)$$

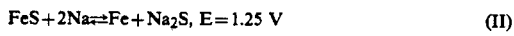

$$FeS + 2Na \rightleftharpoons Fe + Na_2S, E = 1.25 V \qquad (II)$$

The theoretical energy density based upon equations I and II for an average discharge potential of 1.39 V is 1042 Wh/kg. It should be noted that the results presented above are for a nonoptimized cell and further improvements by those skilled in the art could result in a practical battery for applications such as communications, electrical vehicle propulsion, load leveling, and pulse power.

In the method of the invention, in lieu of beta alumina as the solid electrolyte separator, one might use other beta alumina compositions or combinations thereof such as $Na_{1.2}Al_{11}O_{17.1}$, $Na_{1+x}NiAl_{11}O_{17+x/2}$, $Na_{1.67}MgAl_{10.33}O_{17}$, $Na_{1+x}MgAl_{11-x}O_{17}$, $Na_{1+x}NiAl_{11-x}O_{17}$, and $Na_{1+x}ZnAl_{11-x}O_{17}$.

As the cathode binder in the method of the invention one may use any polymeric material such as fluorinated polymer, chlorinated polymer, chlorofluorinated polymer, Teflon, polymer using conducting polymer and mixtures thereof.

The wetting agent may be any organic solvent, inorganic solvent, surfactert, oil, polymer resin and mixtures thereof.

In the method of the invention, the sintering temperature may be any temperature such that the binder flows to bond the mixture or forms a flexible sheet. The sintering time is the time that is required for the binder to flow and bond the mixture and form a flexible sheet. The sintering may be performed in any atmosphere in which decomposition of the mixture will not occur. An inert gas atmosphere is particularly preferred.

In the high temperature solid state electrochemical cell, the anode may be sodium or any sodium based or doped alloy, polymer, and compound and mixtures thereof. In lieu of $FeS_2$ as the active cathode material one might use sulfur, selenium, tellurium, transition metals, $NaCoO_2$, $NiS_2$, $CoS_2$, $NiS$, $CoS$, $FeS$, $TiS_2$ and mixtures thereof.

We wish it to be understood that we do not desire to be limited to the exact details of construction as described for obvious modifications will occur to a person skilled in the art.

What is claimed is:

1. A high temperature solid state electrochemical cell including a sodium-lead alloy anode ($Na_{0.9}Pb_{0.1}$), and $FeS_2$ cathode, and a Teflon-bonded thin, flexible $\beta''$-$Al_2O_3$ solid electrolyte separator.

2. A high temperature solid state electrochemical cell according to claim 1 wherein the electrolyte is made by a method including the steps of:
   (A) mixing about 80 to about 95 weight percent of powdered $\beta''$-$Al_2O_3$ with about 5 to about 15 weight percent of Teflon,
   (B) adding a distilled water-isopropylalcohol solution (about 60/about 40 weight percent) in drop wise addition to the mixture to form a stiff dough,
   (C) roll pressing and sintering the dough at about 280° C. for about one hour under vacuum, and
   (D) cooling under vacuum to ambient temperature.

* * * * *